United States Patent
Yadav et al.

(10) Patent No.: US 12,118,047 B2
(45) Date of Patent: Oct. 15, 2024

(54) SYSTEMS AND METHODS FOR MULTI-DIMENSIONAL ELECTRONIC CONTENT PERFORMANCE PREDICTOR AND DECISION AUTOMATION

(71) Applicant: Yahoo Ad Tech LLC, New York, NY (US)

(72) Inventors: Raj Yadav, Sunnyvale, CA (US); Abhiraj Arumughan Koyamkattil, Sunnyvale, CA (US); Ankit Katiyar, Sunnyvale, CA (US); Tushar Mahule, Sunnyvale, CA (US); Aileen Barrameda, Venice, CA (US)

(73) Assignee: Yahoo Assets LLC, New York, NY (US)

( * ) Notice: Subject to any disclaimer, the term of this patent is extended or adjusted under 35 U.S.C. 154(b) by 256 days.

(21) Appl. No.: 15/955,410

(22) Filed: Apr. 17, 2018

(65) Prior Publication Data

US 2023/0185863 A1    Jun. 15, 2023

(51) Int. Cl.
*G06F 16/00*   (2019.01)
*G06F 16/2457* (2019.01)
*G06F 16/9535* (2019.01)
*G06N 20/00*   (2019.01)
*H04L 67/1097* (2022.01)

(52) U.S. Cl.
CPC .... *G06F 16/9535* (2019.01); *G06F 16/24578* (2019.01); *G06N 20/00* (2019.01); *H04L 67/1097* (2013.01)

(58) Field of Classification Search
CPC .......... G06F 16/9535; G06F 16/24578; G06N 20/00; H04L 67/1097
See application file for complete search history.

(56) References Cited

U.S. PATENT DOCUMENTS

| | | | | |
|---|---|---|---|---|
| 6,125,105 A * | 9/2000 | Edwards | ............. | H04L 12/5602 370/230 |
| 2007/0100993 A1* | 5/2007 | Malhotra | ............... | G06Q 20/20 709/224 |
| 2015/0046515 A1* | 2/2015 | Pei | ..................... | G06Q 30/0269 709/203 |
| 2015/0379557 A1* | 12/2015 | Liu | .................... | G06Q 30/0244 705/14.43 |
| 2016/0162779 A1* | 6/2016 | Marcus | .................. | G06N 20/10 706/12 |
| 2017/0185915 A1* | 6/2017 | Chawla | .................. | G06Q 30/02 |
| 2018/0018553 A1* | 1/2018 | Bach | ..................... | G06K 9/4628 |
| 2018/0060738 A1* | 3/2018 | Achin | ................ | G06Q 30/0201 |
| 2019/0297186 A1* | 9/2019 | Karani | .................. | G06Q 30/01 |

* cited by examiner

*Primary Examiner* — Diedra McQuitery
(74) *Attorney, Agent, or Firm* — Bookoff McAndrews, PLLC

(57) ABSTRACT

Systems and methods are disclosed for vertical integration of a multi-dimensional machine learning algorithm with a digital content management system. A variety of machine learning algorithms are implemented to aid publishers in the discovery of digital content. In contrast to prior methods, which perform retroactive assessments on digital content performance, the instant methods train machine learning algorithms to predict future performance of digital content items. As digital content becomes available to publishers, machine learning algorithms analyze the digital content items in order to present editorial actions publishers should take via a digital content management dashboard.

20 Claims, 6 Drawing Sheets

FIG. 6

SYSTEMS AND METHODS FOR MULTI-DIMENSIONAL ELECTRONIC CONTENT PERFORMANCE PREDICTOR AND DECISION AUTOMATION

TECHNICAL FIELD

Various embodiments of the present disclosure relate generally to the field of digital content performance and, more particularly, to a system and method for executing a machine learning algorithm for generating electronic editorial action recommendations.

BACKGROUND

The progression and development of digital content now allows users to consume media through more channels and more frequently, than in years past. Modern online publishing systems collect media and make digital content available to users online. Online publishers make such content available by utilizing computer networks. Typically, content may be presented on one or more web pages that are accessible over the Internet using a web browser on a user's computing device. The content is usually accessed and located by users via search engines and/or hyperlinked web pages. Such content may include news articles, reports, social media, entertainment media, online shopping information, and advertisements.

Traditionally, it has been difficult to gauge the interest of users in online content. Most online publishers perform retroactive assessments, measuring metrics such as click-through rates and unique visits to a web page to determine content performance. Further, many publishers leverage that metric data in a vacuum, without any indication as to how certain content is performing across an industry.

In some instances, very little information can be gleaned from a user's interaction with content. In fact, in situations where the user fails to take any action on a web page, in some cases little to no information is gathered by the publisher. As such, the publisher lacks the data to make improvements to the content or insight as to how similar content should be published moving forward.

The present disclosure is directed to overcoming one or more of these above-referenced challenges.

SUMMARY OF THE DISCLOSURE

According to certain aspects of the disclosure, systems and methods are disclosed for executing a machine learning algorithm for generating electronic editorial action recommendations for the transmission and display of electronic content.

In one embodiment, a computer-implemented method is disclosed for executing a machine learning algorithm for generating electronic editorial action recommendations for the transmission and display of electronic content. The method includes: obtaining, by a server, a plurality of digital content items from a plurality of content partners; generating digital content items performance predictions, at the server, by analyzing the digital content at the server using the machine learning algorithm and testing the digital content items against stored training data to determine future digital content performance; ranking and filtering the obtained digital content items, based on the determined future digital content performance and a performance threshold; transmitting, by the server, the ranked and filtered digital content items that exceed the performance threshold and an editorial action recommendation, to a publisher digital content management system; and capturing, by the server, publisher action decisions made using the publisher digital content management system.

In accordance with another embodiment, a system is disclosed for executing a machine learning algorithm for generating electronic editorial action recommendations for the transmission and display of electronic content. The system comprises: obtaining, by a server, a plurality of digital content items from a plurality of content partners; generating digital content items performance predictions, at the server, by analyzing the digital content at the server using the machine learning algorithm and testing the digital content items against stored training data to determine future digital content performance; ranking and filtering the obtained digital content items, based on the determined future digital content performance and a performance threshold; transmitting, by the server, the ranked and filtered digital content items that exceed the performance threshold and an editorial action recommendation, to a publisher digital content management system; and capturing, by the server, publisher action decisions made using the publisher digital content management system.

In accordance with another embodiment, a non-transitory computer-readable medium is disclosed for executing a machine learning algorithm for generating electronic editorial action recommendations for the transmission and display of electronic content. A non-transitory, tangible computer readable medium having instructions stored thereon that, in response to instructions by a computer-based system, cause the computer-based system to perform operations comprising: obtaining, by a server, a plurality of digital content items from a plurality of content partners; generating digital content items performance predictions, at the server, by analyzing the digital content at the server using the machine learning algorithm and testing the digital content items against stored training data to determine future digital content performance; ranking and filtering the obtained digital content items, based on the determined future digital content performance and a performance threshold; transmitting, by the server, the ranked and filtered digital content items that exceed the performance threshold and an editorial action recommendation, to a publisher digital content management system; and capturing, by the server, publisher action decisions made using the publisher digital content management system.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 depicts an exemplary electronic screenshot of a publisher digital content management system dashboard.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

Various non-limiting embodiments of the present disclosure will now be described to provide an overall understanding of the principles of the structure, function, and use of system and method for data collection from landing gear components.

As described above, there is a need in the field of digital content creation for systems and methods for executing a machine learning algorithm in order generate electronic editorial action recommendations. Digital content item features can be extracted and can be analyzed against training data from machine learning algorithms in order to determine how well the digital content items will perform in the future and provide editorial recommendations to publishers based on the expected performance of the digital content. The following systems and methods leverage machine learning algorithms to predict future performance of digital content items and provide editorial action recommendations that optimize return on investment.

Figure 1:
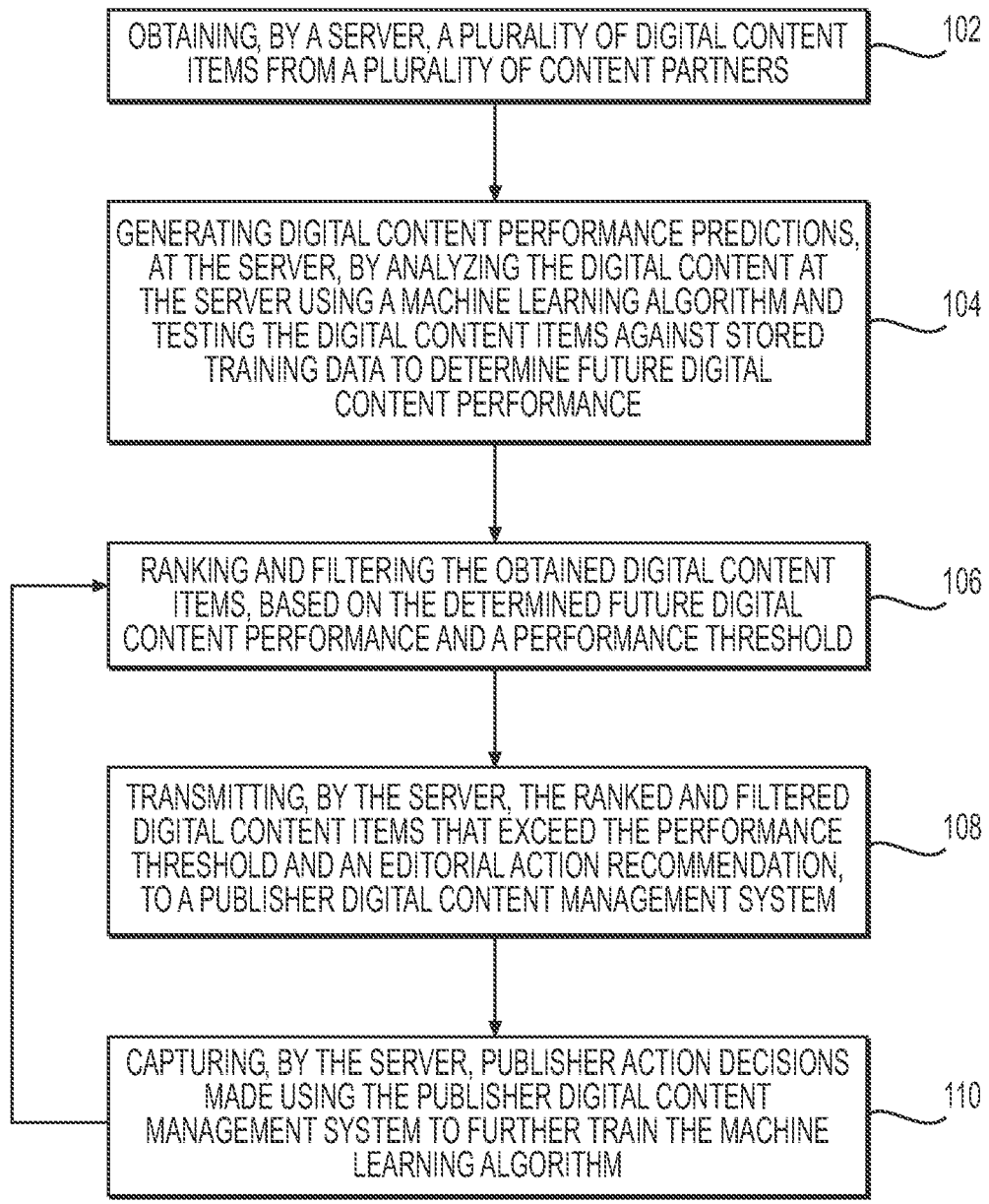
FIG. 1 depicts a flow diagram of an exemplary method of analyzing digital content data by executing machine learning algorithms and providing digital content and editorial action recommendations for the transmission and display of electronic content.

FIG. 1 depicts a flow diagram of an exemplary method 100 of analyzing digital content data by executing machine learning algorithms and providing digital content and editorial action recommendations. As shown in FIG. 1, method 100 comprises a step in which a server obtains a plurality of digital content items from a plurality of content partners (Step 102). Upon receipt of the digital content items, the server generates digital content performance predictions by analyzing the digital content using a machine learning algorithm and testing the digital content items against stored training data to determine future digital content performance (Step 104). The obtained digital content items are then ranked and filtered, based on the determined future digital content performance and a performance threshold (Step 106). The ranked and filtered digital content items that exceed the performance threshold are then transmitted by the server to a publisher content management system (Step 108). After the ranked and filtered digital content items have been transmitted to the publisher digital content management system, method 100 may further include capturing publisher action decisions made using the publisher digital content management system to further train the machine learning algorithm (Step 110).

Figure 2:
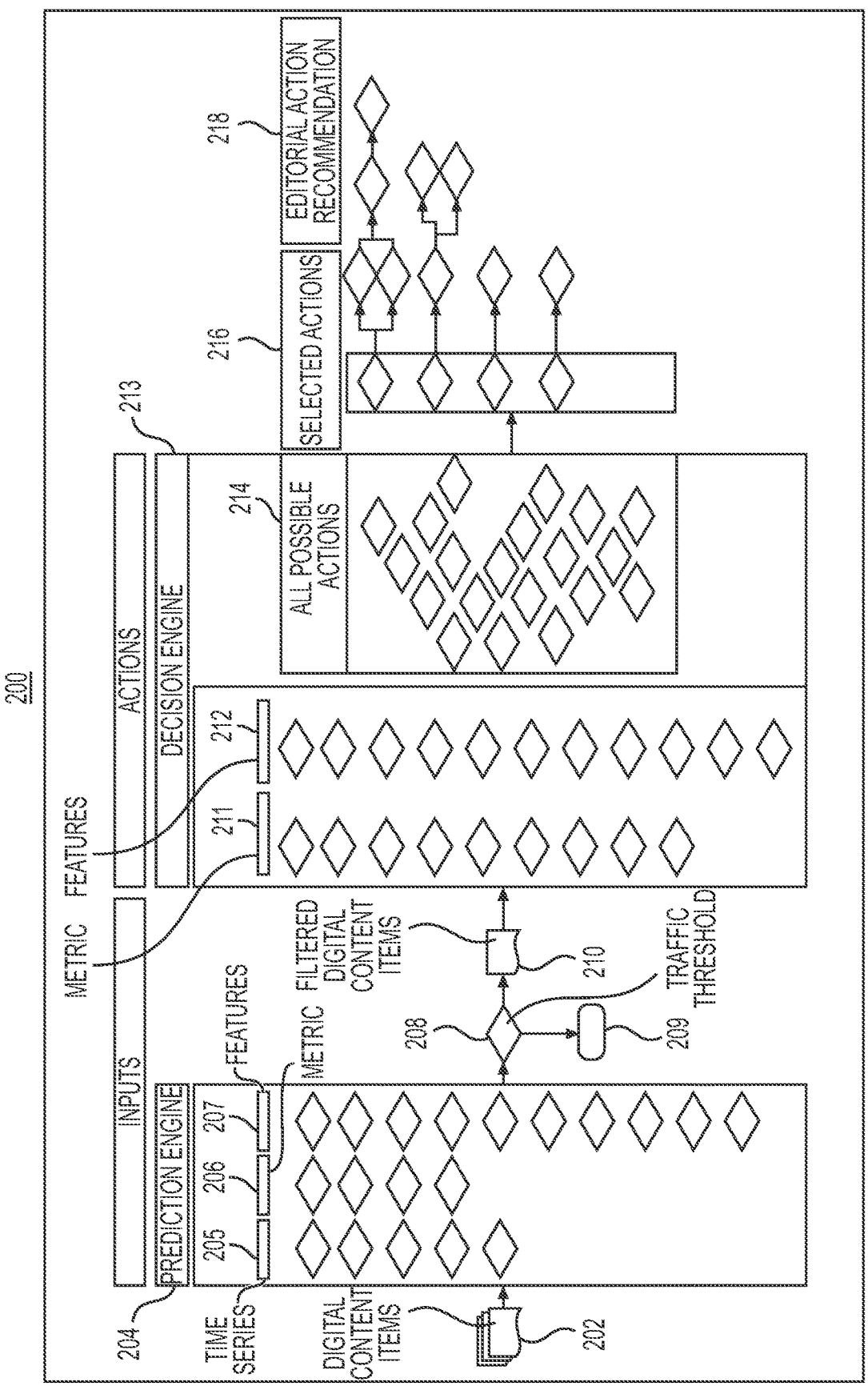
FIG. 2 depicts a flow diagram of an exemplary method of analyzing digital content data based on specific metrics, and for performing actions using a decision engine and recommending electronic editorial decisions.

FIG. 2 depicts a flow diagram of an exemplary method 200 of analyzing digital content data based on specific metrics in a machine learning environment. As shown in FIG. 2, digital content items 202 are passed through a prediction engine 204, wherein the digital content items' attributes are analyzed against various performance criteria in order to predict the potential total traffic value of each digital content item. The performance criteria that digital content items are analyzed against, may include one or more of: time series 205 (e.g. social referral traffic, search referral, internal traffic, user reactions (likes, hearts, bookmarks, shares, reactions) and content cluster size growth rate), metric 206 (e.g. average dwell time, recirculation, social engagement velocity, drop off rate), and features 207 (e.g. syndicated, rich media embed types, tweets, related links, content editing history etc.). The machine learning method 200 then compares the potential total traffic value of the digital content items against a dynamic traffic threshold 208. Digital content items 202 with a potential traffic value that meets or exceeds the traffic threshold 208 are passed through the system, as filtered digital content items 210, for further analysis by the decision engine 213. Digital content items 202 with a potential total traffic value that do not meet or exceed the traffic threshold 208 are dropped from consideration 209. Once the filtered digital content items 210 are transmitted to the decision engine 213, the attributes of filtered digital content items 210 are analyzed against editorial criteria to determine what actions from the list of all possible actions 214 to take with filtered digital content items 210 and are additionally ranked. The editorial criteria may include one or more of: metric 211 (e.g. social referral traffic, search referral, internal traffic, number of comments, dwell time, recirculation, social engagement. Drop off rate and CTR), features 212 (e.g. syndicated, has image, has video, has tweet, has related links, promoted on social media, campaigns, original, premium, and live etc.). The list of all possible actions 214 may include one or more of: (add to lists, edit playlist, breaking news alerts, create content, send mobile alert, tweet, share on social media, change social meta-data, run paid social campaign, publish to another brand, add related links, change video, create video, change image/title, add video, add to newsletters, add playlist, syndicate and much more). The decision engine 213 then selects a subset of selected actions 216, from the all possible actions 214, to be taken with the filtered digital content. The selected actions 216 may include, but is not limited to, one or more of the following: add video, share on social media, breaking news banner, and publish to another brand). Method 200 then involves converting the selected actions 216 into editorial action recommendations 218 for electronic transmission and display. The editorial action recommendations 218 may include, but is not limited to, one or more of the following: summary video, companion video, which account, which states, which links, positioning top/bottom/middle, change image/title, include hashtag/mentions and video position.

Figure 3:
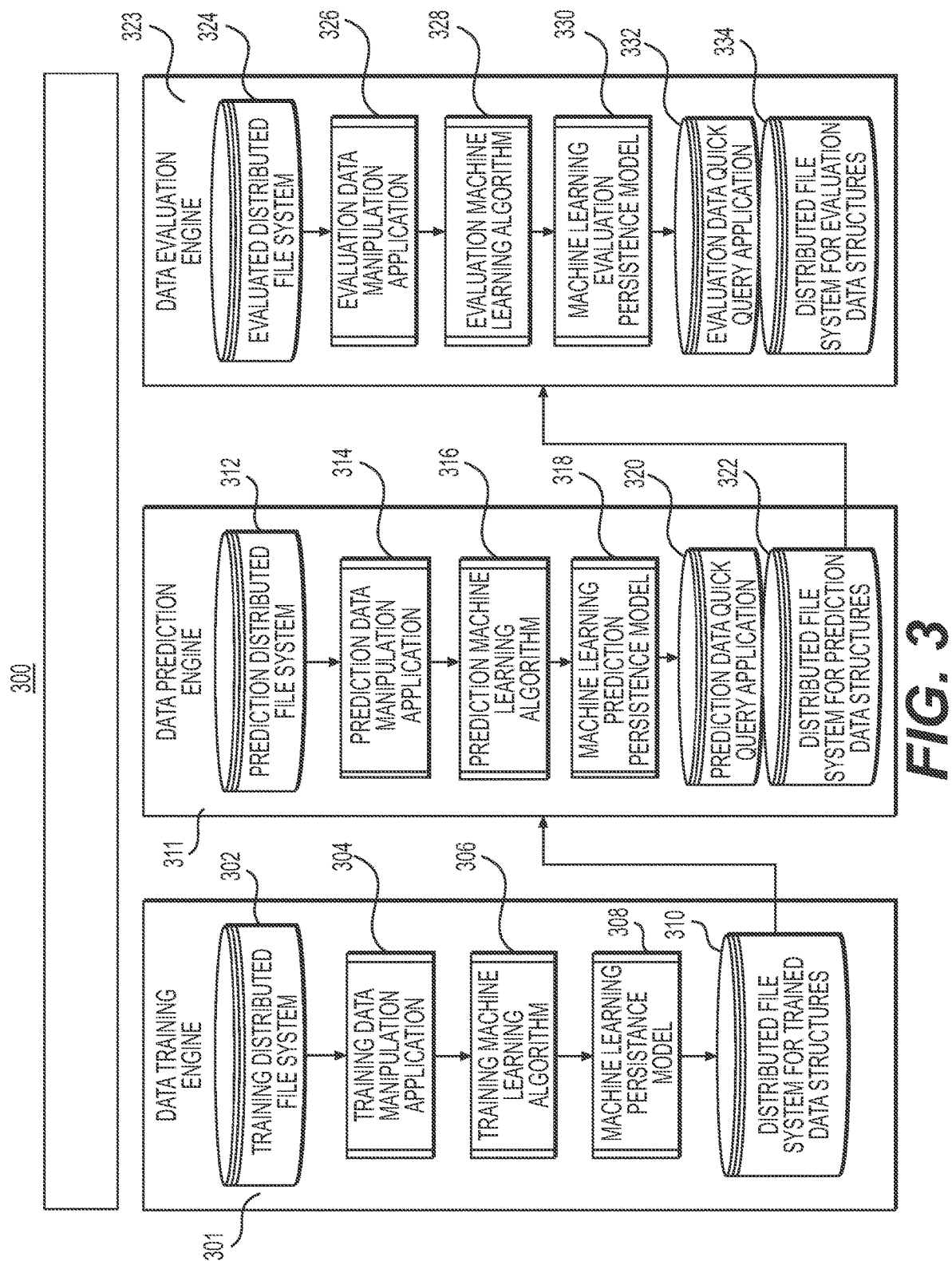
FIG. 3 depicts a block diagram of an exemplary architecture diagram of an exemplary machine learning system and machine learning algorithm for generating content predictions and electronic editorial recommendations.

FIG. 3 depicts a block diagram of an exemplary computer architecture and data flow of a machine learning system and environment 300. As shown in FIG. 3, in general, machine learning system and environment 300 may comprise a data training engine 301, a data prediction engine 311, and a data evaluation engine 323. Training data in the data training engine 301 may be trained daily over a time period (e.g. a predetermined time period), usually months, and initially stored in a training distributed file system 302 (e.g. one or more databases). A training data manipulation application 304 may call for the training data to be input from the training distributed file system 302 and further prepare the training data to be analyzed. Once the training data is in condition to be trained, it is obtained from the training data manipulation application 304 by a training machine learning algorithm 306. The training machine learning algorithm 306 processes the training data with its model(s) to further fine tune both the data being analyzed and the machine algorithm itself. The training machine learning algorithm 306 then inputs the training data into a machine learning persistence model 308, which becomes the baseline algorithm for analyzing training data. During this transition from the initial training machine learning algorithm 306 to the machine learning persistence model 308, previous training machine learning algorithms are stored for potential later use. The machine learning persistence model 308 and the training data that is output from the machine learning persistence model 308 are stored in the distributed file system for trained data structures 310. The machine learning persistence model 308 and the training data that is output from the training persistence model 308 are then input into the data prediction engine 311, wherein the training data may be reclassified as prediction data.

Prediction data in the data prediction engine 311 is analyzed and predictions are made over a time period (e.g. a predetermined time period), usually days, and is initially stored in a prediction distributed file system 312. A prediction data manipulation application 314 calls for the training data to be input from the prediction distributed file system (e.g. one or more databases) 312 and further prepares the prediction data to be analyzed. Once the prediction data is in condition to be analyzed, it is obtained by a prediction machine learning algorithm 316 from the prediction data manipulation application 314. The prediction machine learning algorithm 316 processes the training data with its model(s) to further fine tune both the data being analyzed and the machine algorithm itself. The prediction machine learning algorithm 316 then inputs the training data into a machine learning prediction persistence model 318, which is a model(s) that is chosen to be the baseline algorithm for analyzing training data. During this transition from the initial prediction machine learning algorithm 316 to the prediction persistence model, previous prediction machine learning algorithms are stored for potential later use. The machine learning prediction persistence model 318 and the training data that is output from the machine learning prediction persistence model 318 are processed by the prediction data quick query application 320 and stored in the distributed file system for prediction data structures 322. The machine learning prediction persistence model 318 and the training data that is output from the machine learning prediction persistence model 318 are then input into the data evaluation engine 323, wherein the training data may be reclassified as evaluation data.

Evaluation data in the data evaluation engine 323, is analyzed and evaluated over a time period (e.g. a predetermined time period), usually hourly, and is initially stored in a evaluation distributed file system 324. An evaluation data manipulation application 326 calls for the evaluation data to be input from the evaluation distributed file system (e.g. one or more databases) 324 and further prepares the evaluation data to be analyzed. Once the evaluation data is in condition to be analyzed, it is obtained by an evaluation machine learning algorithm 328 from the evaluation data manipulation application 326. The evaluation machine learning algorithm 328 processes the evaluation data with its model(s) to further fine tune both the data being analyzed and the machine algorithm itself. The evaluation machine learning algorithm 328 then inputs the training data into a machine learning evaluation persistence model 330, which is a model(s) that is chosen to be the baseline algorithm for analyzing evaluation data. During this transition from the initial evaluation machine learning algorithm 328 to the machine learning evaluation persistence model 330, previous evaluation machine learning algorithms are stored for potential later use. The machine learning evaluation persistence model 330 and the evaluation data that is output from the machine learning evaluation persistence model 318 and are processed by the evaluation data quick query application 332 and stored in the distributed file system for evaluation data structures 334. The machine learning system and environment 300 may implement:

Supervised learning
    Unsupervised learning
    Reinforcement learning
    Semi-supervised learning The machine learning system and environment 300 may implement one or more of the following algorithms, including but not limited to:

Regression:
    Ordinary Least Squares Regression (OLSR)
    Linear Regression
    Logistic Regression
    Stepwise Regression
    Multivariate Adaptive Regression Splines (MARS)
    Locally Estimated Scatterplot Smoothing (LOESS)
Instance-Based:
    k-Nearest Neighbor (kNN)
    Learning Vector Quantization (LVQ)
    Self-Organizing Map (SOM)
    Locally Weighted Learning (LWL)
Regularization:
    Ridge Regression
    Least Absolute Shrinkage and Selection Operator (LASSO)
    Elastic Net
    Least-Angle Regression (LARS)
Decision Tree:
    Random Forest
    Classification and Regression Tree (CART)
    Iterative Dichotomiser 3 (ID3)
    C4.5 and C5.0 (different versions of a powerful approach)
    Chi-squared Automatic Interaction Detection (CHAID)
    Decision Stump
    M5
    Conditional Decision Trees
Bayesian:
    Naive Bayes
    Gaussian Naive Bayes
    Multinomial Naive Bayes
    Averaged One-Dependence Estimators (AODE)
    Bayesian Belief Network (BBN)
    Bayesian Network (BN)
Clustering:
    k-Means
    k-Medians Expectation Maximization (EM)
Hierarchical Clustering
Association Rule Learning:
　Apriori algorithm
　Eclat algorithm
Deep Learning Algorithms:
　Deep Boltzmann Machine (DBM)
　Deep Belief Networks (DBN)
　Convolutional Neural Network (CNN)
　Stacked Auto-Encoders
Dimensionality Reduction Algorithms:
　Principal Component Analysis (PCA)
　Principal Component Regression (PCR)
　Partial Least Squares Regression (PLSR)
　Sammon Mapping
　Multidimensional Scaling (MDS)
　Projection Pursuit
　Linear Discriminant Analysis (LDA)
　Mixture Discriminant Analysis (MDA)
　Quadratic Discriminant Analysis (QDA)
　Flexible Discriminant Analysis (FDA)
Ensemble:
　Boosting
　Bootstrapped Aggregation (Bagging)
　AdaBoost
　Stacked Generalization (blending)
　Gradient Boosting Machines (GBM)
　Gradient Boosted Regression Trees (GBRT)

In one embodiment, ranking accuracy may be measured by the following equation:
Ordered Area Under Curve $$OAUC = \frac{\sum a_{r_i}(r_i - i)}{\lfloor \frac{n}{2} \rfloor \sum_{i=1}^{\lceil \frac{n}{2} \rceil}\left(\lfloor \frac{n}{2} \rfloor + i\right)}$$

Figure 4:
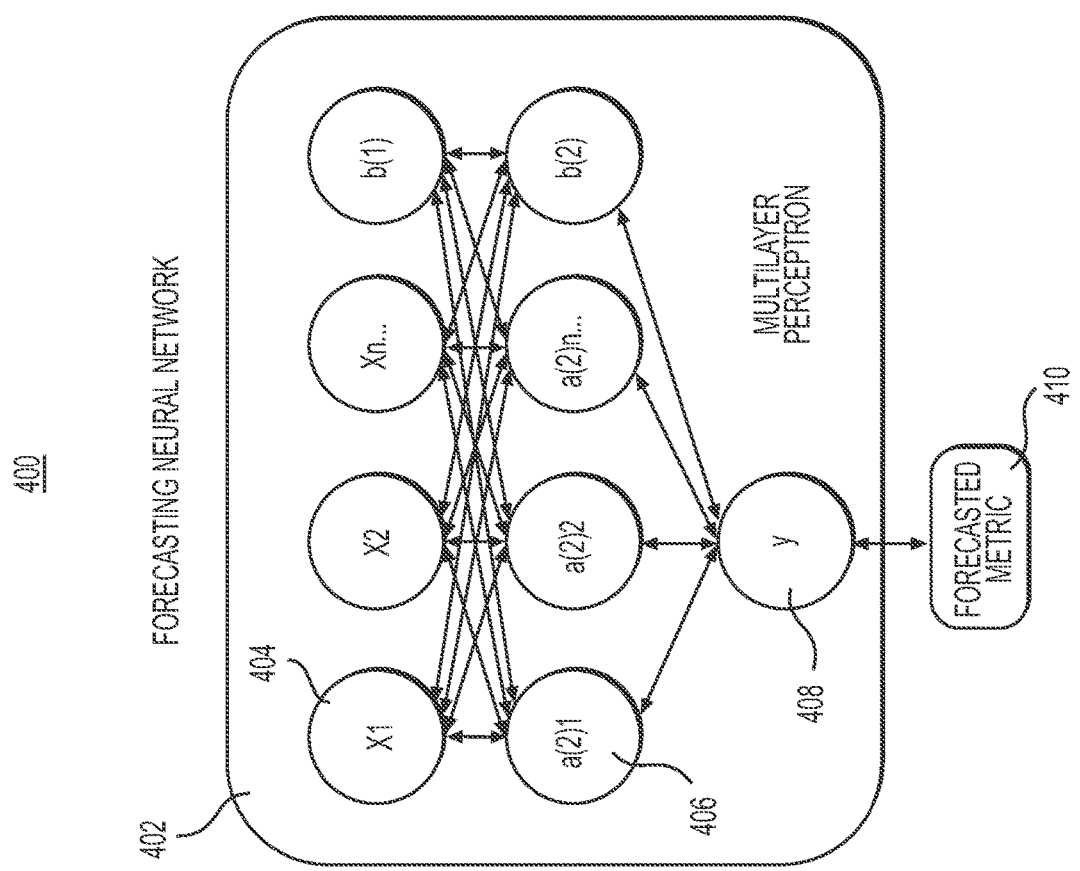
FIG. 4 depicts a block diagram of an exemplary method of a neural network forecasting learning strategy.

FIG. 4 depicts a block diagram of an exemplary method 400 of a neural network forecasting learning strategy. The forecasting neural network 402 may be a multi-layer structure with one or more perceptrons at an input layer 404, one or more perceptrons at a hidden layer 406, and one or more perceptrons at an output layer 408. The input layer 404, hidden layer 406, and output layer 408 perceptrons may have multiple inputs capable of assigning a weight to incoming data. The weights may be adjusted as a result of a previous test. The neural network may output a forecast metric 410 after analyzing data via an algorithm/model (e.g. a regression model). The algorithm/model implemented by the neural network may be further defined and governed by various hyperparameters (e.g. neural network architecture, training parameters, and model parameters). The forecasting neural network 402 may be governed by the following algorithms:
Perceptron Weight Correction Formulas $$\Delta w = \eta \times d \times x$$

where $\Delta$ w, is the change in weight;
　where d, is the predicted output or desired output;
　where $\eta$, is the learning rate; and
　where x, is the input data.
Root Mean Square Error Rate $$RMSE_{fo} = [\sum_{i=1}^{N}(z_{f_i} - z_{o_i})^2/N]^{1/2}$$

As an alternative to utilizing perceptrons, the neural network may implement one or more of the following algorithms:
　Back-Propagation
　Hopfield Network
　Radial Basis Function Network (RBFN)

Figure 5:
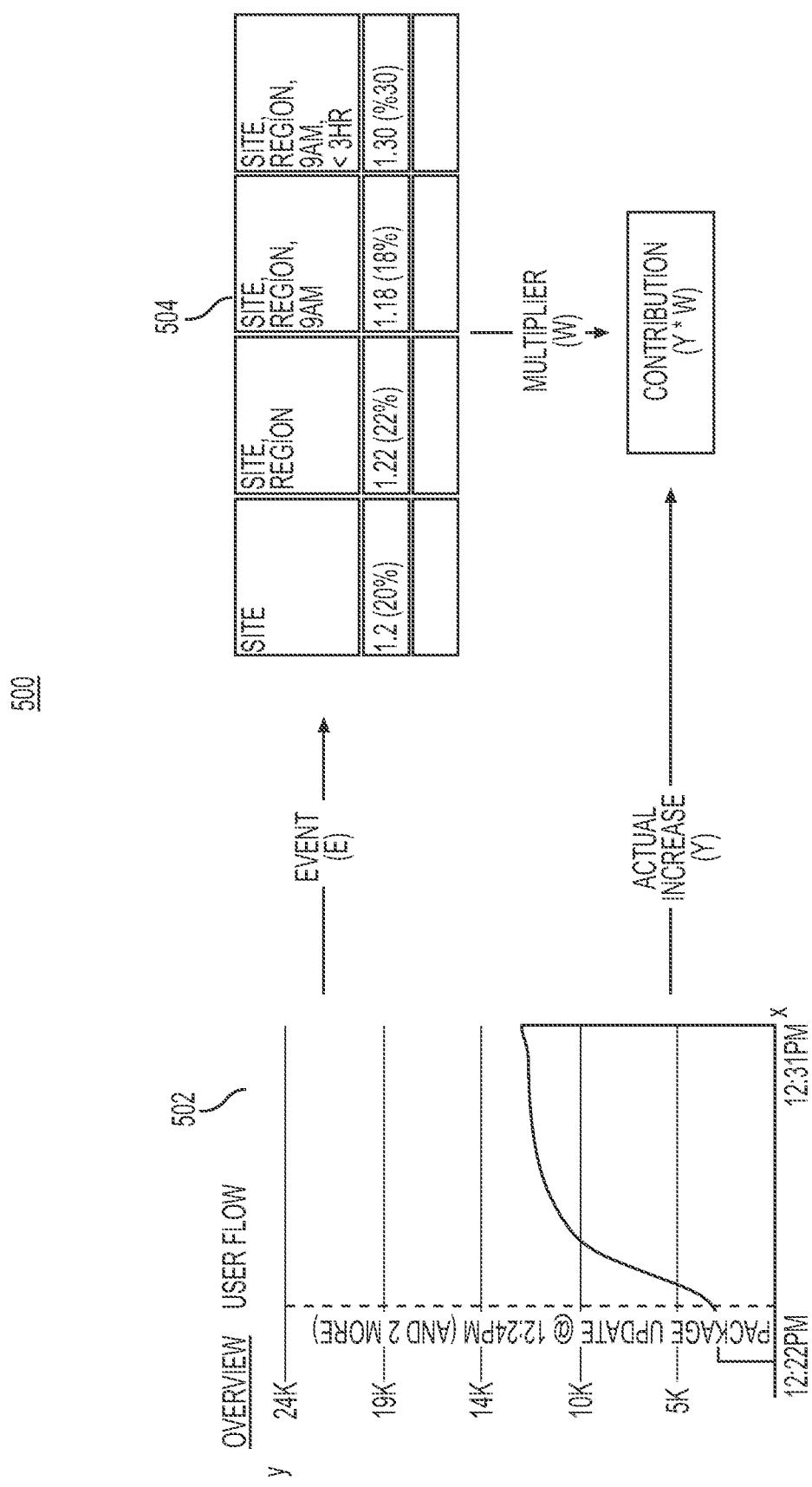
FIG. 5 depicts a block diagram of an exemplary method of reporting the effect of an action (e.g., an electronic editorial decision) on a particular event.

FIG. 5 depicts a block diagram of an exemplary method of reporting the effect of an action on a particular event. The dashboard reporting environment 500 of FIG. 5 may comprise several various graphs and charts. For example, via a traffic graph 502, the dashboard may be configured to convey a visual representation of traffic as both a function of time (across the x axis) and number of visitors (across the y axis). Similar information can be conveyed via a traffic table 504, in which a change in traffic on a website, due to an event (e.g. publishing a new article), can be conveyed as percentage of change in traffic. Additionally, the traffic related data may be segmented by the specific page of web site, the geographic region responsible for traffic, and as a function of change over time.

Figure 6:
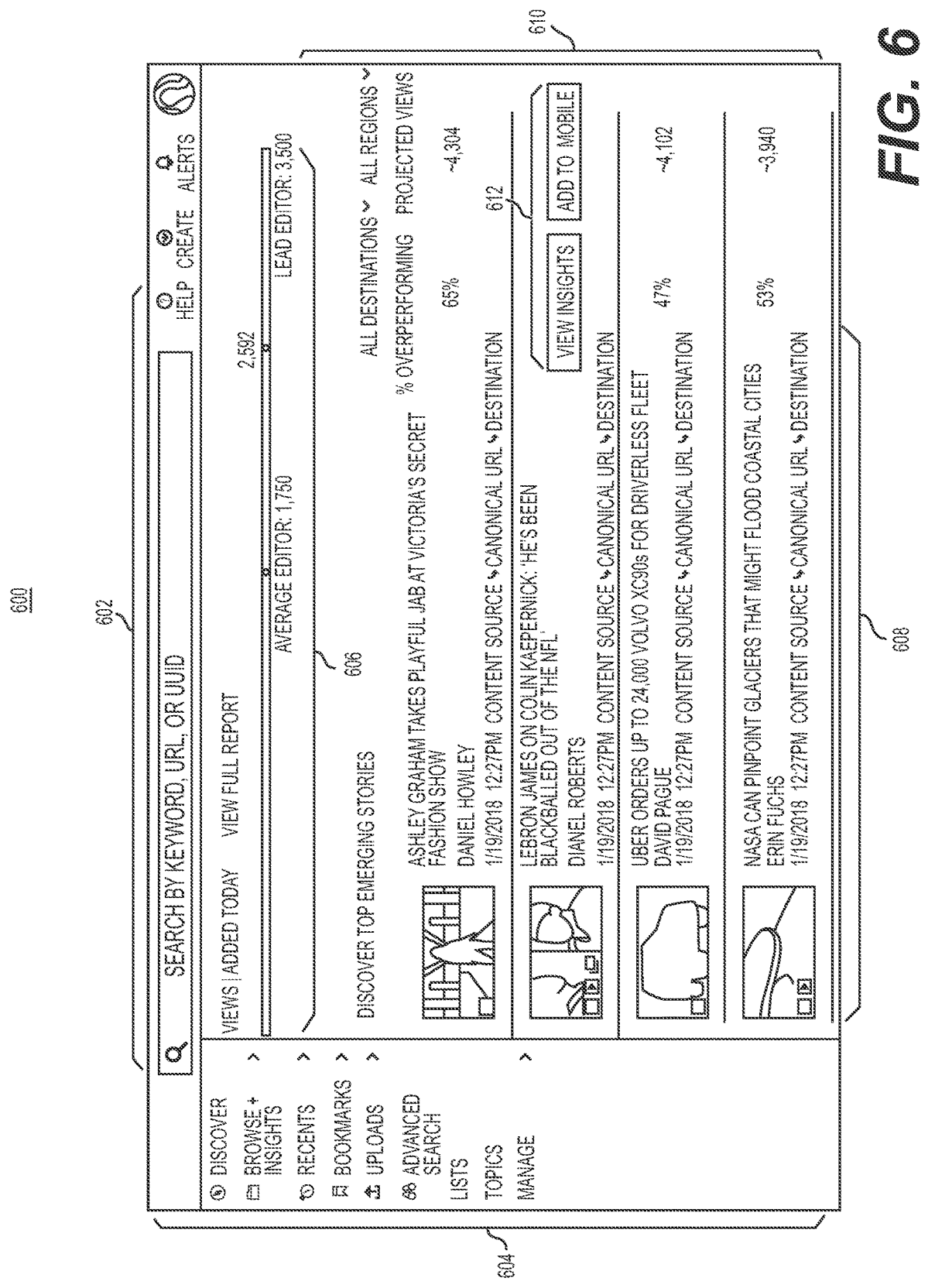

FIG. 6 depicts an exemplary publisher digital content management system ("DCMS") dashboard 600. The DCMS dashboard 600 provides a multitude of useful tools to users (e.g. publishers) to leverage the editorial action recommendations, e.g., such as those generated at Step 218 of method 200. The DCMS dashboard 600 may have a search toolbar 602, which may be configured to allow a user to search for digital content items, previous actions taken by the user, and various desired reports. The DCMS dashboard 600 may further comprise a navigation menu 604, which can present links to relevant publisher tools, including but not limited to: a link to discover new dashboard tools or emerging digital content items, a link to browse insights and reports regarding traffic and actions taken by the user, a link to bookmarked digital content items, a link to uploaded content, a link to advance searching features, and links to user repository data.

In one embodiment, the DCMS 600 may present a goal achievement bar 606, which conveys the user's impact on a particular web site given the editorial actions the user has taken. For example, the goal achievement bar 606 can be a bar graph (i.e. a visual representation) which conveys the user's progress toward achieving a goal and a comparison of the user's impact in comparison to other users' impact. Presenting achievement information provides meaningful insight into a user's progress over a period of time and also serves as a powerful reminder to continue to perform editorial actions. The DCMS dashboard 600 may comprise a section presenting the top emerging digital content items 608 the user should publish. The top emerging digital content items 608 will be relevant to the user and display images, digital content item titles, the time the digital content item was created, the digital content item's source, etc.

The DCMS dashboard 600 may also comprise a section 610 configured to communicate why the top emerging digital content items 608 are important to the user. For example, it may provide a notification that a particular emerging digital content item 608 is breaking news and views of the emerging digital content item 608 have increased significantly in a certain geographic region during a particular time period. The DCMS dashboard 600 may provide the functionality to filter the aforementioned information by one or more metrics, content type, predicted performance rate(s) and geographic region(s). Notably, to aid in the discovery of relevant top emerging digital content items 608, the editorial action recommendations 218, which were generated as output of the machine learning algorithms implemented in environment 200, may be conveyed to the user as action buttons 612. The action buttons 612 may allow a user the ability to instantly publish emerging digital content items 608 (e.g. automatically or manually) or provide insight information into expected performance, if the emerging digital content item 608 was published.

The aforementioned systems and methods may be implemented via any suitable system infrastructure. The following discussion provides a brief, general description of a suitable computing environment in which the present disclosure may be implemented. Although not illustrated, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, multiprocessor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor. However, some machine learning, deep learning and neural network environments may require more robust processing units; for example, an Application Specific Integrated Circuit (ASIC) Tensor Processing Unit (TPU) which may be assembled with 16 GB of high bandwidth memory and may be capable of delivering over 180 teraflop performance; or a Graphics Processing Unit (GPU).

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the disclosure being indicated by the following claims.

What is claimed is:

1. A computer-implemented method for generating optimized digital content for electronic display, the method comprising:
    receiving, at a prediction engine of a server, one or more digital content items from one or more content partners, the one or more digital content items including stored data;
    analyzing, using a machine learning algorithm and a neural network, each of the one or more digital content items against performance criteria to determine a corresponding potential total traffic value;
    comparing, by the prediction engine, the corresponding potential total traffic value for each of the one or more digital content items against a traffic threshold;
    based on comparing the corresponding potential total traffic value for each of the one or more digital content items against the traffic threshold, determining, by the prediction engine, a first subset of the one or more digital content items and a second subset of the one or more digital content items, wherein the first subset of the one or more digital content items include the one or more digital content items that have met or exceeded the traffic threshold, and the second subset of the one or more digital content items include the one or more digital content items that have not met the traffic threshold;
    transmitting, by a decision engine of the server, the first subset of the one or more digital content items that have met or exceeded the traffic threshold to a digital content management system;
    generating, by the decision engine of the server, a ranking of the first subset of the one or more digital content items and a corresponding action recommendation determined by the machine learning algorithm and the neural network; and
    conveying to a user, by the decision engine of the server, the ranking of the first subset of the one or more digital content items and the corresponding action recommendation as action buttons, the action buttons including a first button that instantly publishes a top emerging digital content item to mobile devices and a second button that provides insight information comprising expected performance.

2. The computer-implemented method of claim 1, wherein training data of the neural network is trained over a predetermined period of time.

3. The computer-implemented method of claim 1, wherein training data of the neural network is stored in a distributed file system.

4. The computer-implemented method of claim 1, wherein the digital content items that exceed the traffic threshold, exceed a predetermined web site traffic value.

5. The computer-implemented method of claim 1, wherein the machine learning algorithm utilizes the neural network to forecast digital content item performance.

6. The computer-implemented method of claim 5, wherein the machine learning algorithm utilizes supervised learning, unsupervised learning, reinforcement learning and/or semi-supervised learning; and
    wherein the neural network is multilayered and includes an input layer and one or more of a hidden layer and an output layer.

7. The computer-implemented method of claim 3, wherein the one or more action recommendations received from the digital content management system is fed back into the neural network to further train the stored training data.

8. A computer system for executing a machine learning algorithm for generating optimized digital content, comprising:
    a memory having processor-readable instructions stored therein; and
    a processor configured to access the memory and execute the processor-readable instructions, which when executed by the processor configures the processor to perform plurality of functions, including functions for:
    receiving, at a prediction engine of a server, one or more digital content items from one or more content partners, the one or more digital content items including performance information;
    analyzing, using a machine learning algorithm and a neural network, each of the one or more digital content items against performance criteria to determine a corresponding potential total traffic value;
    comparing, by the prediction engine, the corresponding potential total traffic value for each of the one or more digital content items against a traffic threshold;
    based on comparing the corresponding potential total traffic value for each of the one or more digital content items against the traffic threshold, determining, by the prediction engine, a first subset of the one or more digital content items and a second subset of the one or more digital content items, wherein the first subset of the one or more digital content items include the one or more digital content items that have met or exceeded the traffic threshold, and the second subset of the one or more digital content items include the one or more digital content items that have not met the traffic threshold;
    transmitting, by a decision engine of the server, the first subset of the one or more digital content items that have met or exceeded the traffic threshold to a digital content management system;
    generating, by the decision engine of the server, a ranking of the first subset of the one or more digital content items and a corresponding action recommendation determined by the machine learning algorithm and the neural network; and
    conveying to a user, by the decision engine of the server, the ranking of the first subset of the one or more digital content items and the corresponding action recommendation as action buttons, the action buttons including a first button that instantly publishes a top emerging digital content item to mobile devices and a second button that provides insight information comprising expected performance.

9. The computer system of claim 8, wherein training data of the neural network is trained over a predetermined period of time.

10. The computer system of claim 8, wherein training data of the neural network is stored in a distributed file system.

11. The computer system of claim 8, wherein the machine learning algorithm utilizes the neural network to forecast digital content item performance.

12. The computer system of claim 8, wherein the digital content items that exceed the traffic threshold, exceed a predetermined web site traffic value.

13. The computer system of claim 12, wherein the machine learning algorithm utilizes supervised learning, unsupervised learning, reinforcement learning and/or semi-supervised learning; and
   wherein the neural network is multilayered and includes an input layer and one or more of a hidden layer and an output layer.

14. The computer system of claim 8, wherein the one or more action recommendations received from the digital content management system is fed into the neural network to further train the neural network.

15. A non-transitory computer-readable medium for executing a machine learning algorithm for generating optimized digital content, comprising:
   a memory having processor-readable instructions stored therein, to direct a processor for:
   receiving, at a prediction engine of a server, one or more digital content items from one or more content partners, the one or more digital content items including performance information;
   analyzing, using a machine learning algorithm and a neural network, each of the one or more digital content items and against performance criteria to determine a corresponding potential total traffic value;
   comparing, by the prediction engine, the corresponding potential total traffic value for each of the one or more digital content items against a traffic threshold;
   based on comparing the corresponding potential total traffic value for each of the one or more digital content items against the traffic threshold, determining, by the prediction engine, a first subset of the one or more digital content items and a second subset of the one or more digital content items, wherein the first subset of the one or more digital content items include the one or more digital content items that have met or exceeded the traffic threshold, and the second subset of the one or more digital content items include the one or more digital content items that have not met the traffic threshold;
   transmitting, by a decision engine of the server, the first subset of the one or more digital content items that have met or exceeded the traffic threshold to a digital content management system;
   generating, by the decision engine of the server, a ranking of the first subset of the one or more digital content items and a corresponding action recommendation determined by the machine learning algorithm and the neural network; and
   conveying to a user, by the decision engine of the server, the ranking of the first subset of the one or more digital content items and the corresponding action recommendation as action buttons, the action buttons including a first button that instantly publishes a top emerging digital content item to mobile devices and a second button that provides insight information comprising expected performance.

16. The non-transitory computer-readable medium of claim 15, wherein training data of the neural network is trained over a predetermined period of time.

17. The non-transitory computer-readable medium of claim 15, wherein generating a ranking and a corresponding action recommendation comprises using the machine learning algorithm to compare the one or more digital content items to editorial criteria, the editorial criteria comprising at least one of metrics and features.

18. The non-transitory computer-readable medium of claim 15, wherein the machine learning algorithm utilizes the neural network to forecast digital content item performance.

19. The non-transitory computer-readable medium of claim 18, wherein the machine learning algorithm utilizes supervised learning, unsupervised learning, reinforcement learning and/or semi-supervised learning; and
   wherein the neural network is multilayered and includes an input layer and one or more of a hidden layer and an output layer.

20. The non-transitory computer-readable medium of claim 15, wherein the one or more action recommendations received from the digital content management system is fed into the neural network to further train the neural network.

* * * * *